[12] United States Patent
Zhang

(10) Patent No.: US 6,842,618 B2
(45) Date of Patent: Jan. 11, 2005

(54) METHOD AND SYSTEM FOR PERFORMING CALL ADMISSION CONTROL IN THE UPLINK FOR THIRD GENERATION WIRELESS COMMUNICATION SYSTEMS

(75) Inventor: Guodong Zhang, Patchogue, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/301,001

(22) Filed: Nov. 21, 2002

(65) Prior Publication Data
US 2004/0192321 A1 Sep. 30, 2004

Related U.S. Application Data
(60) Provisional application No. 60/365,355, filed on Mar. 14, 2002.

(51) Int. Cl.[7] .............................. H04Q 7/20; G01R 31/08
(52) U.S. Cl. ........................ 455/452; 455/453; 455/450; 370/232
(58) Field of Search ................................ 455/452, 453, 455/450, 443, 436, 438; 370/232, 397, 231

(56) References Cited
U.S. PATENT DOCUMENTS 5,838,671 A * 11/1998 Ishikawa et al. ............ 370/335
5,884,174 A * 3/1999 Nagarajan et al. .......... 455/436
6,314,293 B1 * 11/2001 Servi et al. ................. 455/450
6,459,681 B1 * 10/2002 Oliva ......................... 370/232
2002/0119783 A1 * 8/2002 Bourlas et al. ............. 455/453

OTHER PUBLICATIONS

Zhao Liu, SIR Based Call admission control for DS CDMA Cellular system May 1999 IEEE Journal on and vol. 12 No. 4, May 1994, pp 638–644.*

* cited by examiner

Primary Examiner—David Hudspeth
Assistant Examiner—Sheila Smith
(74) Attorney, Agent, or Firm—Volpe and Koenig, P.C.

(57) ABSTRACT

A method and system for performing call admission control in wireless communication systems is disclosed. Resource units required by a new user are assigned based on an outage probability of each uplink timeslot. The outage probability of each timeslot is updated as the resource units are assigned so that each resource unit assignment results in the lowest possible contribution to total outage probability. Once all of the resource units are assigned, the total outage probability is computed based on the resource allocation. If the total outage probability is below a predetermined value, the new user is admitted. If the total outage probability is above the predetermined value, the new user is rejected.

4 Claims, 2 Drawing Sheets

METHOD AND SYSTEM FOR PERFORMING CALL ADMISSION CONTROL IN THE UPLINK FOR THIRD GENERATION WIRELESS COMMUNICATION SYSTEMS

CROSS REFERENCE TO RELATED APPLICATION

This application claims priority from U.S. Provisional Application No. 60/365,355, filed on Mar. 14, 2002, which is incorporated by reference as if fully set forth.

BACKGROUND

The present invention relates to the field of communications, specifically wireless communications. More specifically, the present invention relates to call admission control in third generation wireless systems.

Third generation wireless communications, such as wideband code division multiple access time division duplex (WCDMA-TDD) systems, will support not only voice service, but also a wide range of broadband services, such as video and Internet traffic. In such a system, the goal of call admission control is to guarantee that the quality of service (QoS) is met for all users admitted into the system. Call admission control directly affects the QoS of mobile users, and the stability and capacity of the system. Therefore, call admission control is very important for the design of WCDMA-TDD systems.

In recent years, there have been some advances regarding call admission control in WCDMA-FDD systems but few in WCDMA-TDD systems. One such system addresses the problem by making resource allocation based on a fixed required signal to interference ratio (SIR). In WCDMA-TDD systems, however, the required SIR of a user is not fixed and, in contrast, changes with time because of imperfect power control. In WCDMA-FDD systems, there are no timeslots whereas in WCDMA-TDD systems a user can use more than one timeslot.

A need therefore exists for providing call admission control for TDD systems.

SUMMARY

The present invention is a system and method for performing call admission control where admission decisions are based on a dynamic SIR requirement and the assumption that a user can use multiple timeslots. The present invention is implemented without using online measurement, thereby avoiding software and hardware implementation costs attributed thereto.

BRIEF DESCRIPTION OF THE DRAWING(S)

DETAILED DESCRIPTION OF THE PREFERRED EMBODIMENT(S)

Figure 1:
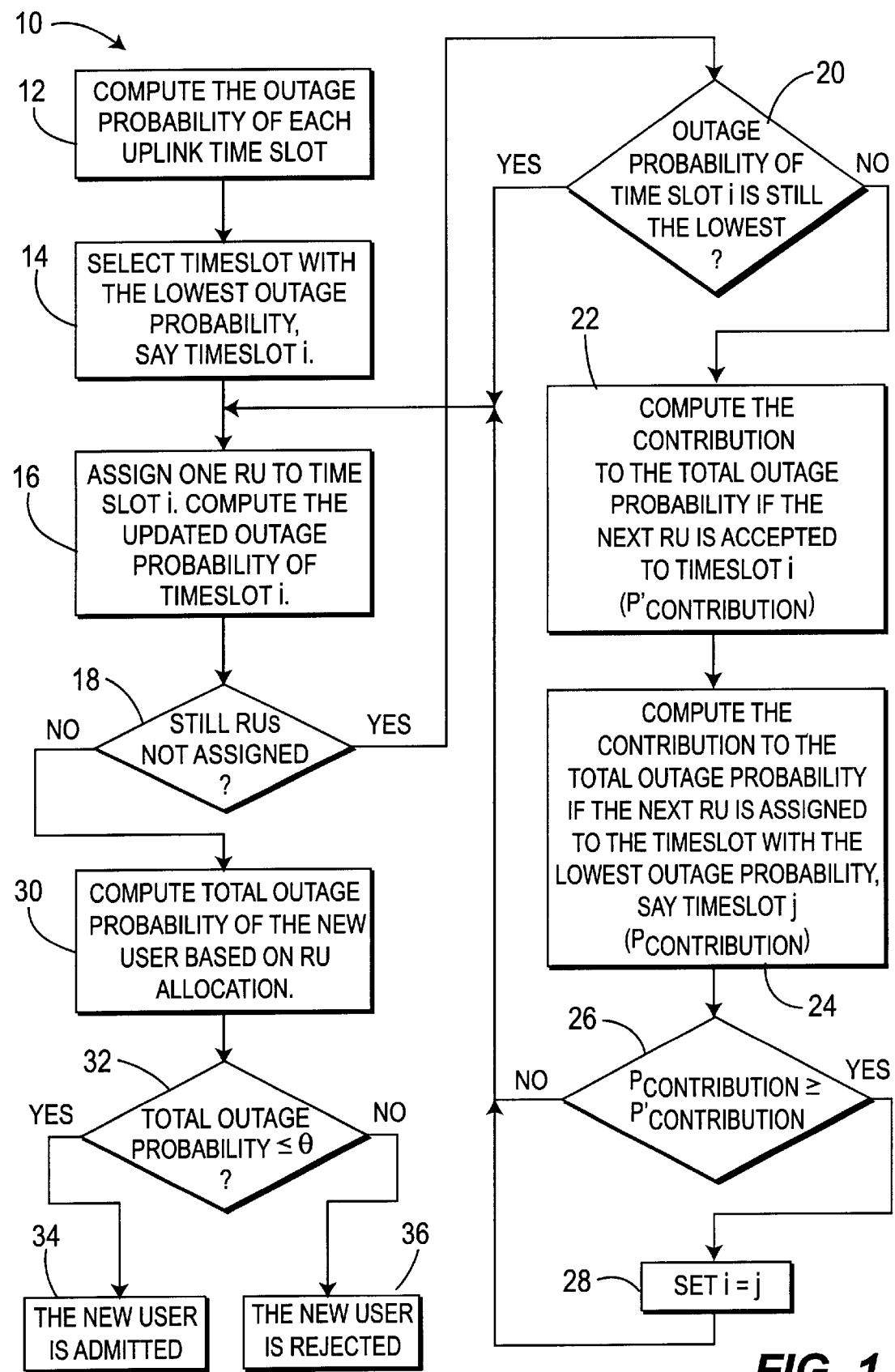
FIG. 1 is a method for performing call admission control in the uplink for third generation wireless communication systems in accordance with the preferred embodiment of the invention.

In accordance with the present invention, call admission control is performed in WCDMA-TDD systems (where users can use multiple timeslots) while taking into account the fact that each user's required signal to interference ratio (SIR) is a random variable. Resource allocation is optimized so as to yield the lowest total outage probability ($P_{out-total}$) for a new user and to ensure $P_{out-total}$ is below a predetermined value.

The present invention is preferably implemented using the following assumptions. First, as specified by the Third Generation Partnership Project (3GPP) standards, each frame is divided into 15 timeslots. Second, the chip rate of a WCDMA-TDD system is 3.84 Mcps making the equivalent chip rate in one timeslot 256 kcps (i.e. 3.84 Mcps/15= 256 kcps). Third, a multi-user detection (MUD) receiver is used at the base station (BS).

In each timeslot, Orthogonal Variable Spreading Factor (OVSF) codes are used for channelization codes. The spreading factor of a channelization code can take a value of 2, 4, 8, and 16 in the uplink. For purposes of describing the present invention, a resource unit (RU) corresponds to a particular physical channel and is defined as a channelization code having spreading factor 16 in a particular time slot. RUs therefore correspond to physical channels in a particular timeslot.

For a new user seeking admission to a cell, the primary goal of call admission control is to properly allocate RUs (i.e. physical channels) so that QoS requirements are guaranteed, for both the new user and any users already in the cell. The number of RUs required by a new user depends on the type of call the new user has placed. For example, a new user placing a voice call requires two RUs while a new user placing a 64 k data call requires five RUs.

Decisions made by a call admission control system are based on whether RUs can be allocated successfully for the new user. Whether a RU can be allocated successfully for a new user depends on the individual outage probabilities ($P_{out}$) for all of the timeslots in which RUs have been assigned. Therefore, $P_{out}$ is the probability that, in a particular timeslot, a user's required SIR will be below a certain predetermined value. In WCDMA-TDD systems, however, the required SIR of each user is not fixed, but follows a certain distribution thereby making $P_{out}$ difficult to calculate. That is, even though the distribution of the SIR is known, the computation of $P_{out}$, is still very complex, and cannot be done in real time.

The Gaussian approximation, in contrast, provides a sufficiently approximate result and has relatively low computation complexity. Therefore, the Gaussian approximation approach is used to allow the RNC (Radio Network Controller) to compute $P_{out}$ for each timeslot and make resource allocation decisions in real time.

The $P_{out}$ of every timeslot assigned to a new user may be combined to compute $P_{out-total}$ for the new user. Assuming a new user is allocated RUs in a particular number of timeslots, the $P_{out-total}$ of a new user is defined as the probability that an outage will occur in at least one of those timeslots. The $P_{out-total}$ may be computed as desired. By way of example, $P_{out-total}$ may be computed according to $$P_{out-total} = 1 - \prod_{i=\Omega} (1 - P_{out}(i)),$$

where $\Omega$ is the set of timeslots in which RUs have been allocated to the user.

Referring now to FIG. 1, a method 10 is shown wherein call admission control is performed in the uplink for third generation wireless communication systems. Assuming, purely for purposes of describing the invention, that a new user requires two RUs (i.e. the new user has placed a voice call), the method 10 begins in step 12 by computing the current $P_{out}$, of each uplink timeslot. Again, $P_{out}$ is the probability that a new user's SIR is below a predetermined value in a particular timeslot and is computed for each uplink timeslot. Therefore, in step 12, the probability of the new user's SIR being below the predetermined value is computed for each timeslot. As explained, $P_{out}$ accounts for the fact that the user's SIR changes with time and is computed by the RNC using the Gaussian approximation to reduce computation complexity.

Once $P_{out}$ has been computed for each timeslot, the timeslot having the lowest $P_{out}$ say timeslot i, is selected in step 14. Since timeslot i is the timeslot with the lowest $P_{out}$, the $P_{out}$ in timeslot i is denoted $P_{out}(i)$. In step 16, one RU is assigned to timeslot i and $P_{out}(i)$ is updated accordingly. Once the first RU has been assigned, the method proceeds to step 18. In step 18, the method determines whether additional RUs need to be assigned. As mentioned, for purposes of describing the invention, it can be assumed that the new user requires two RUs. Therefore, the determination in step 18 will be positive and the method will proceed to step 20.

In step 20, the method determines whether $P_{out}(i)$ is still the lowest $P_{out}$ (i.e. the method determines whether, despite being assigned a RU, timeslot i still has the lowest $P_{out}$). If $P_{out}(i)$ is still the lowest $P_{out}$, the method goes back to step 16 and the second RU is assigned to timeslot i and continues as indicated. If, in contrast, $P_{out}(i)$ is no longer the lowest $P_{out}$ the method proceeds to step 22. In step 22, $P_{contribution}$ is computed. The $P_{contribution}$ is the contribution to $P_{out-total}$ assuming the next RU (i.e. the second RU according to the assumption noted above) is accepted to timeslot i despite the fact that $P_{out}(i)$ is no longer the lowest $P_{out}$. The $P_{contribution}$ is the same value as the new $P_{out}$, of timeslot i. That is, $P_{contribution}$ is equal to $P_{out}(i)$ In step 24, $P_{contribution}$ is computed. The $P_{contribution}$ is the contribution to $P_{out-total}$ assuming the next RU (i.e. the second RU according to the assumption noted above) is accepted to the timeslot having the lowest $P_{out}$, say timeslot j. The $P_{contribution}$ is given by $P_{contribution}=1-(1-P_{out}(i))\cdot(1-P_{out}(j))$ Once $P'_{contribution}$ and $P_{contribution}$ have been computed, the method proceeds to step 26 where it determines whether $P_{contribution}$ is greater than or equal to $P'_{contribution}$ (i.e. $P_{out}$ (i)'). If $P_{contribution}$ is greater than or equal to $P'_{contribution}$, the method proceeds to step 16 wherein the next RU will be assigned to timeslot i despite the fact that timeslot i no longer has the lowest $P_{out}$. That is, even though timeslot i no longer has the lowest $P_{out}$, assigning the next RU to timeslot i will result in a lower $P_{out-total}$ than assigning the next RU to timeslot j, which actually has the lowest $P_{out}$. If, in contrast, $P_{contribution}$ is less than $P'_{contribution}$, i is set equal to j in step 28 and the method proceeds to step 16. The method sets i equal to j so that, in step 16, the next RU is assigned to timeslot j because assigning the next RU to timeslot j will result in the lowest $P_{out-total}$.

From step 16, the method again proceeds to step 18. Note, steps 20 through 28 would not have been necessary where the new user only needed one RU. But, because in the assumption of the example the user needed two RUs, one run through steps 20 through 28 was necessary in order to determine the optimal allocation of the second RU. Steps 20 through 28 are performed, as needed, for every RU required by the user. Once all of the RUs have been assigned, the method proceeds to step 30. In step 30, $P_{out-total}$ is computed to determine the outage probability of the new user based on the allocation of RU(s), as allocated in steps 12 through 28.

In step 32, the method determines whether $P_{out-total}$ is less than or equal to a predetermined value, say θ. The predetermined value θ is an operator dependent parameter and may be any value, as desired, depending on the desired level of network stability. If $P_{out-total}$ is less than θ, the new user is admitted (step 34). If not, the new user is rejected (step 36).

Pursuant to the present invention, $P_{out-total}$ increases as the number of users increases and saturates around the predetermined value θ thereby dramatically improving system stability (i.e. the number of dropped calls). Due to the stringent admission standards, the present invention also results in a dramatic increase in blocking probability (which also increases as the number of users) in comparison to static sequential and random call admission control methods. The combination of increased stability and blocking probability significantly improves users QoS as, from a user's perspective, having a call blocked is much more preferable than having a call dropped.

Figure 2:
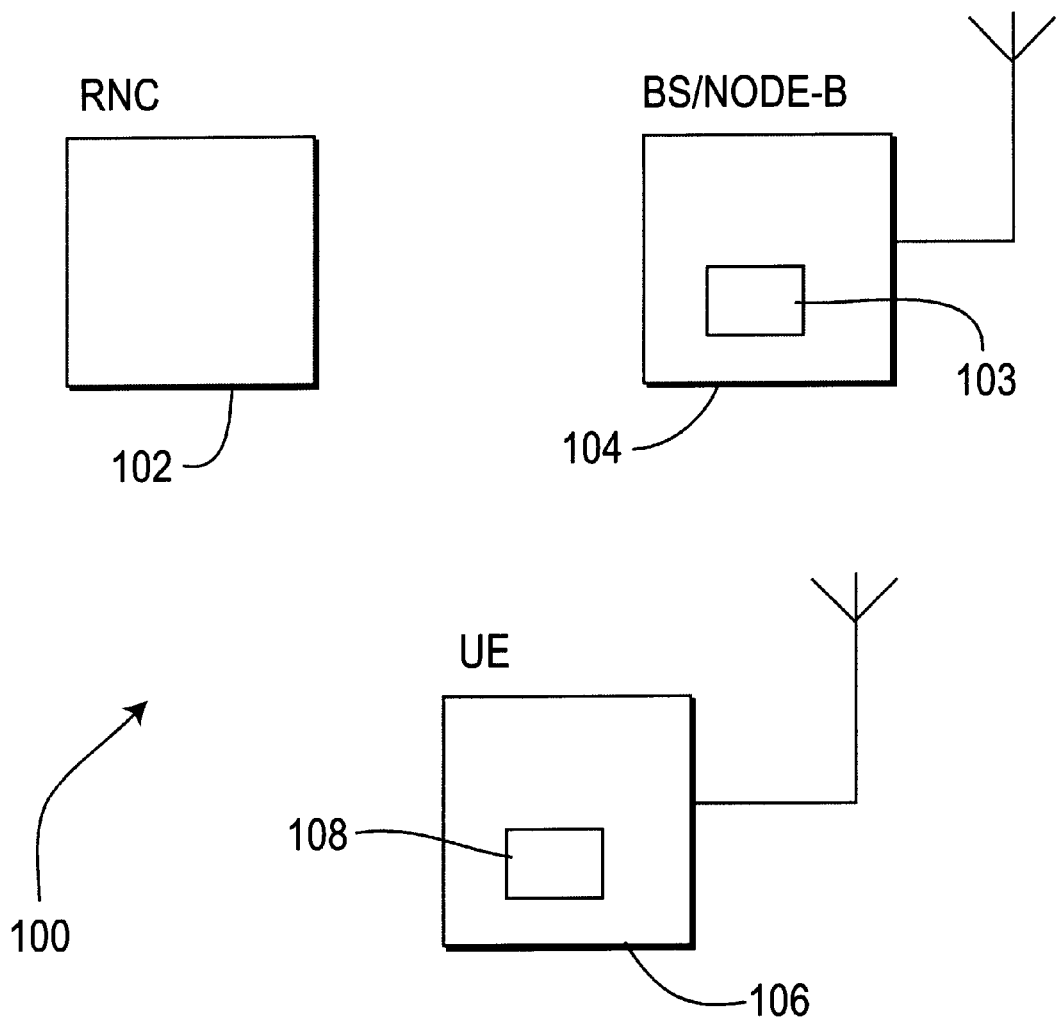
FIG. 2 is a call admission control system in accordance with the preferred embodiment of the invention.

Referring now to FIG. 2, a system 100 is shown for implementing call admission control according to the present invention. The system 100 comprises a RNC 102, a BS or Node-B 104 and user equipment (UE) 106 wherein the BS and UE each have a multi-user detection (MUD) receiver 103, 108, respectively.

When the UE 106 is used by a user to place a call, the RNC 102 will perform call admission control and allocate RUs required by that new call to appropriate timeslots so as to ensure the lowest possible $P_{out-total}$ and to ensure that $P_{out-total}$ remains below the predetermined threshold θ.

To perform call admission control, the RNC 102 computes $P_{out}$ for every uplink timeslot and assigns a RU to the timeslot with the lowest $P_{out}$. If there are additional RUs required by the new user that need to be allocated, the RNC 102 will assign subsequent RUs to the same timeslot the previous RU was assigned to, so long as that timeslot still has the lowest $P_{out}$. If that timeslot no longer has the lowest $P_{out}$, the RNC 102 will determine whether it still should assign subsequent RUs to that timeslot or to the timeslot now having the lowest $P_{out}$. To make that determination the RNC 102 determines which timeslot results in the lowest contribution to $P_{out}$. The RNC repeats this analysis for every RU required by the new call.

Once all of the RUs that are required by the new user have been allocated to particular timeslots, the RNC 102 determines whether the allocation results in $P_{out-total}$ being below the predetermined θ. If $P_{out-total}$ is below θ, the new user is admitted. If not, the new user is rejected.

Although the present invention has been described in detail, it is to be understood that the invention is not limited thereto, and that various changes can be made therein without departing from the spirit and scope of the invention, which is defined by the attached claims.

What is claimed is:

1. A method of performing call admission control by assigning resource units required by a new user to timeslots, the method comprising:
   (a) determining, for each of a plurality of timeslots, a probability that the timeslot has a signal-to-interference ratio (SIR) that will fall below a predetermined value;
   (b) selecting one of the plurality of timeslots having the lowest probability determined in step (a);
   (c) assigning the selected timeslot to a first one of the resource units;
   (d) determining that the selected timeslot still has the lowest probability of having a SIR that will fall below a predetermined value after being assigned to the first resource unit;
   (e) assigning a second one of the resource units to the selected timeslot;

(f) determining a total probability for the new user that the SIR of a timeslot assigned to the resource units will fall below a predetermined value; and (g) admitting the new user if the total probability is less than a predetermined value.

2. A method of performing call admission control by assigning resource units required by a new user to timeslots, the method comprising:

(a) determining, for each of a plurality of timeslots, a probability that the timeslot has a signal-to-interference ratio (SIR) that will fall below a predetermined value;

(b) selecting one of the plurality of timeslots having the lowest probability determined in step (a);

(c) assigning the selected timeslot to a first one of the resource units;

(d) determining that the selected timeslot no longer has lowest probability of having a SIR that will fall below a predetermined value after being assigned to the first resource unit;

(e) determining whether to assign a second one of the resource units to the selected timeslot or a different timeslot based on how the resource unit assignment will affect a total probability determined for the new user that the SIR of a timeslot assigned to the resource units will fall below a predetermined value; and (f) admitting the new user if the total probability is less than a predetermined value.

3. A system for performing call admission control by assigning resource units required by a new user to timeslots, the system comprising:

a user equipment (UE) for placing a call; and a radio network controller (RNC) for performing the call admission control and allocating resource, units required by the call placed by the UE, the RNC comprising:

(a) means for determining, for each of a plurality of timeslots, a probability that the timeslot has a signal-to-interference ratio (SIR) that will fall below a predetermined value;

(b) means for selecting one of the plurality of timeslots having the lowest probability determined by the determining means;

(c) means for assigning the selected timeslot to a first one of the resource units;

(d) means for determining that the selected timeslot still has the lowest probability of having a SIR that will fall below a predetermined value after being assigned to the first resource unit;

(e) means for assigning a second one of the resource units to the selected timeslot;

(f) means for determining a total probability for the new user that the SIR of a timeslot assigned to the resource units will fall below a predetermined value; and (g) means for admitting the new user if the total probability is less than a predetermined value.

4. A system for performing call admission control by assigning resource units required by a new user to timeslots, the system comprising:

a user equipment (UE) for placing a call; and a radio network controller (RNC) for performing the call admission control and allocating resource units required by the call placed by the UE, the RNC comprising:

(a) means for determining, for each of a plurality of timeslots, a probability that the timeslot has a signal-to-interference ratio (SIR) that will fall below a predetermined value;

(b) means for selecting one of the plurality of timeslots having the lowest probability determined by the determining means;

(c) means for assigning the selected timeslot to a first one of the resource units;

(d) means for determining that the selected timeslot no longer has lowest probability of having a SIR that will fall below a predetermined value after being assigned to the first resource unit;

(e) means for determining whether to assign a second one of the resource units to the selected timeslot or a different timeslot based on how the resource unit assignment will affect a total probability determined for the new user that the SIR of a timeslot assigned to the resource units will fall below a predetermined value; and (f) means for admitting the new user if the total probability is less than a predetermined value.

* * * * *

UNITED STATES PATENT AND TRADEMARK OFFICE
CERTIFICATE OF CORRECTION

PATENT NO. : 6,842,618 B2
DATED : January 11, 2005
INVENTOR(S) : Guodong Zhang

It is certified that error appears in the above-identified patent and that said Letters Patent is hereby corrected as shown below:

Column 2,
Line 28, after the words "placing a", delete "64 k" and insert therefor -- 64k --.

Column 3,
Line 11, after the word "$P_{out}$", insert -- , --.
Line 27, after the words "In step 22,", delete "$P_{contribution}$" and insert therefor -- $P'_{contribution}$ --.
Line 28, after the word "The", delete "$P_{contribution}$" and insert therefor -- $P'_{contribution}$ --.
Line 31, after the words "$P_{out.}$ The", delete "$P_{contribution}$" and insert therefor -- $P'_{contribution}$ --.
Line 32, after the word "new", delete "$P_{out'}$" and insert therefor -- $P_{out}$ --.
Line 33, before the word "is", delete "$P_{contribution}$" and insert therefor -- $P'_{contribution}$ --.
Line 33, after the word "to", delete "$P_{out}(i)$" and insert therefor -- $P_{out}(i)'$ --.

Column 5,
Line 35, after the word "resource", delete ",".

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

PATENT NO.        : 6,842,618 B2
APPLICATION NO.   : 10/301001
DATED             : January 11, 2005
INVENTOR(S)       : Guodong Zhang It is certified that error appears in the above-identified patent and that said Letters Patent is hereby corrected as shown below:

IN THE DRAWINGS

Fig. 1 should read

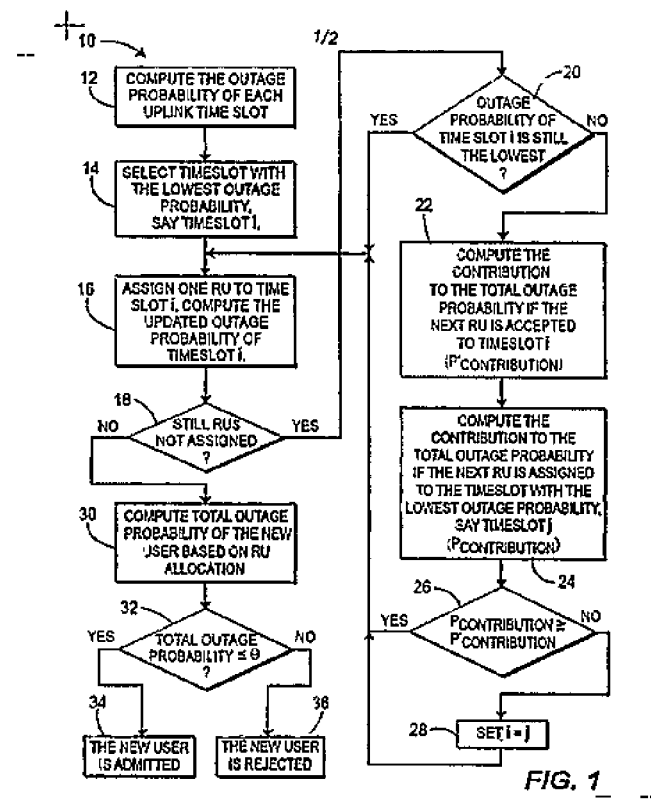

Signed and Sealed this

Nineteenth Day of December, 2006

JON W. DUDAS
*Director of the United States Patent and Trademark Office*